United States Patent
Aflaki Beni

(10) Patent No.: US 10,404,964 B2
(45) Date of Patent: Sep. 3, 2019

(54) METHOD FOR PROCESSING MEDIA CONTENT AND TECHNICAL EQUIPMENT FOR THE SAME

(71) Applicant: Nokia Technologies Oy, Espoo (FI)

(72) Inventor: Payman Aflaki Beni, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/868,425

(22) Filed: Jan. 11, 2018

(65) Prior Publication Data
US 2018/0205933 A1    Jul. 19, 2018

(30) Foreign Application Priority Data

Jan. 17, 2017 (GB) .................... 1700739.4

(51) Int. Cl.
*H04N 13/106* (2018.01)
*G02B 27/01* (2006.01)
(Continued)

(52) U.S. Cl.
CPC ....... *H04N 13/158* (2018.05); *G02B 27/0093* (2013.01); *G02B 27/017* (2013.01);
(Continued)

(58) Field of Classification Search
CPC .. H04N 13/158; H04N 13/332; H04N 13/117; H04N 13/271; H04N 13/344; H04N 13/243; G06T 7/70; G02B 27/0093; G02B 27/017; G02B 2027/0141; G02B 2027/10021
See application file for complete search history.

(56) References Cited

U.S. PATENT DOCUMENTS 6,233,004 B1    5/2001  Tanaka et al.
7,884,855 B2    2/2011  Ortiz
(Continued)

FOREIGN PATENT DOCUMENTS

EP    2348733 A2    7/2011

OTHER PUBLICATIONS

"Source Cameras and Multiple Views Into a Scene", Steam, Retrieved on Dec. 13, 2017, Webpage available at :http://steamcommunity.com/discussions/.
(Continued)

*Primary Examiner* — Michael E Teitelbaum
(74) *Attorney, Agent, or Firm* — Alston & Bird LLP

(57) ABSTRACT

The invention relates to a method and apparatus for implementing the method. The method comprises receiving a first captured stream of an event from a first multicamera; providing on a head mounted display a presentation of the first captured stream; receiving at least a second captured stream of the event from at least a second multicamera, wherein the first and the second captured streams have been captured simultaneously from different perspectives of the event; switching the presentation of the first captured stream on the head mounted display to a presentation of the second captured stream, wherein the switching comprises rendering on the head mounted display a presentation of at least one view between the first and second multicameras, wherein the rendering depends on the intrinsic and extrinsic parameters of the at least two multicameras.

19 Claims, 12 Drawing Sheets

(51) Int. Cl.

| | | |
|---|---|---|
| *G02B 27/00* | (2006.01) | |
| *H04N 13/344* | (2018.01) | |
| *H04N 13/117* | (2018.01) | |
| *G06T 7/70* | (2017.01) | |
| *H04N 13/332* | (2018.01) | |
| *H04N 13/243* | (2018.01) | |
| *H04N 13/271* | (2018.01) | |

(52) U.S. Cl.
CPC .......... *G06T 7/70* (2017.01); *H04N 13/117* (2018.05); *H04N 13/243* (2018.05); *H04N 13/271* (2018.05); *H04N 13/332* (2018.05); *H04N 13/344* (2018.05); *G02B 2027/0141* (2013.01); *G06T 2207/10021* (2013.01)

(56) References Cited

U.S. PATENT DOCUMENTS

| | | | |
|---|---|---|---|
| 9,271,048 | B2 | 2/2016 | Yee et al. |
| 2002/0190991 | A1 | 12/2002 | Efran et al. |
| 2005/0273830 | A1 | 12/2005 | Silver et al. |
| 2007/0021055 | A1 | 1/2007 | Arseneau et al. |
| 2010/0026712 | A1* | 2/2010 | Aliprandi ............ H04N 13/111 345/629 |
| 2011/0032361 | A1* | 2/2011 | Tamir .................... H04N 7/181 348/157 |
| 2012/0150953 | A1 | 6/2012 | Costanzo et al. |
| 2012/0307068 | A1 | 12/2012 | Feinson |
| 2014/0285621 | A1* | 9/2014 | Cheng .................. H04N 13/106 348/43 |
| 2015/0015680 | A1 | 1/2015 | Wang et al. |
| 2016/0086306 | A1 | 3/2016 | Nishimaki et al. |
| 2016/0191893 | A1 | 6/2016 | Gewickey et al. |

OTHER PUBLICATIONS

Fitzgibbon et al., "Image-Based Rendering Using Image-Based Priors", International Journal of Computer Vision, vol. 63, No. 2, Jul. 2005, pp. 141-151.

Fehn, "Depth-Image-Based Rendering (DIBR), Compression, and Transmission for a New Approach on 3D-TV", Proc. SPIE, Stereoscopic Displays and Virtual Reality Systems, vol. 5291, No. 2 May 21, 2004, pp. 93-104.

Shibata, "Head Mounted Display", Displays, vol. 23, No. 1-2, Apr. 2002, pp. 57-64.

Search Report received for corresponding United Kingdom Patent Application No. 1700739.4, dated Jun. 30, 2017, 3 pages.

Extended European Search Report received for corresponding European Patent Application No. 18150005.9, dated Jun. 14, 2018, 8 pages.

Office Action for European Application No. EP 18 150 005.9 dated Apr. 24, 2019; 5 pages.

* cited by examiner

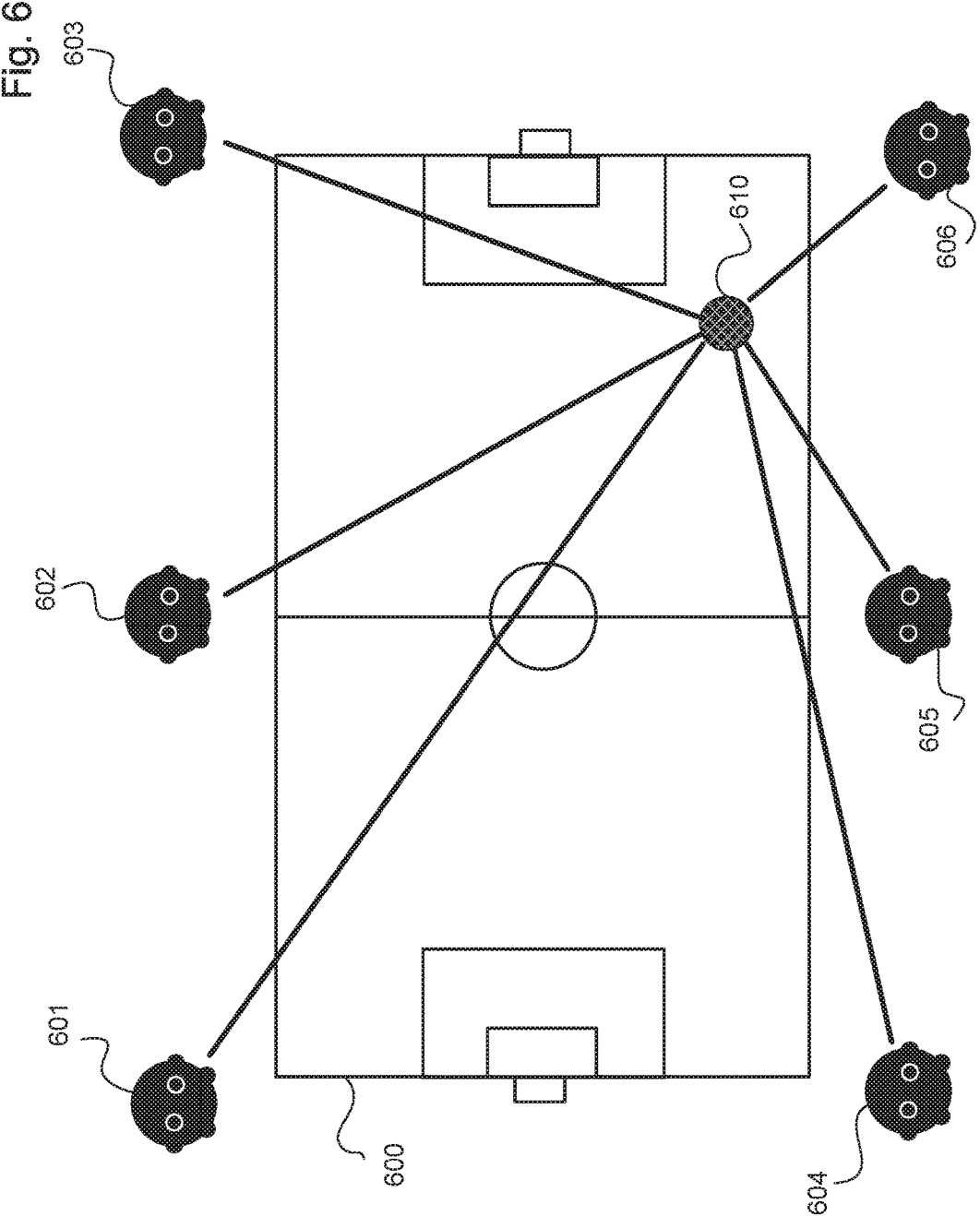

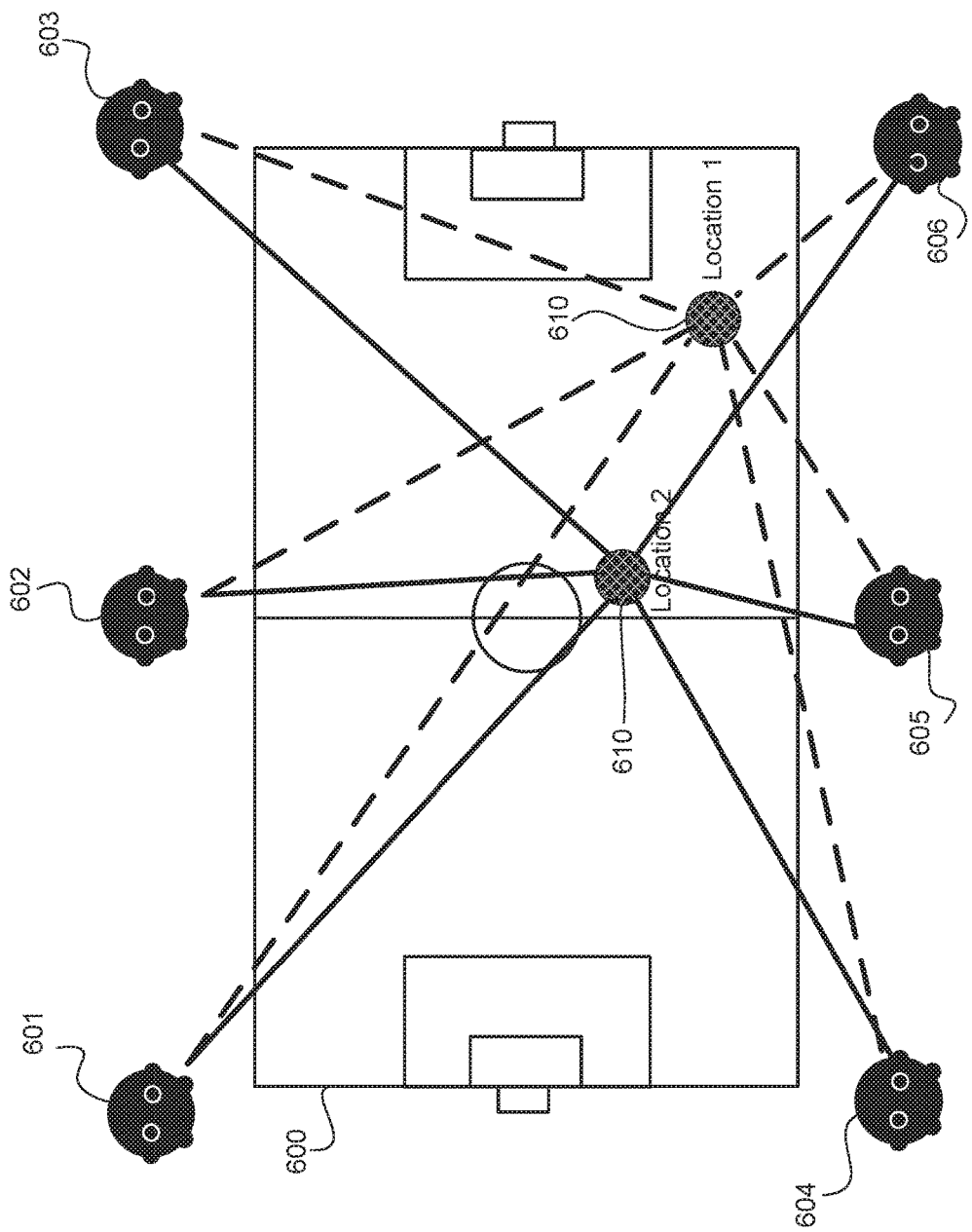

METHOD FOR PROCESSING MEDIA CONTENT AND TECHNICAL EQUIPMENT FOR THE SAME

TECHNICAL FIELD

The present solution generally relates to processing media content. In particular, the solution relates to a method and technical equipment for multicamera system.

BACKGROUND

Since the beginning of photography and cinematography, the most common type of image and video content has been captured and displayed as a two-dimensional (2D) rectangular scene. The main reason of this is that cameras are mainly directional, i.e., they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all axes). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

Now there has been invented an improved method and technical equipment implementing the method, for enabling 360-degree presentation from different points of view. Various aspects of the invention include a method, an apparatus and a computer readable medium comprising a computer program stored therein, which are characterized by what is stated in the independent claims. Various embodiments of the invention are disclosed in the dependent claims.

According to a first aspect, there is provided a method comprising receiving a first captured stream of an event from a first multicamera; providing on a head mounted display a presentation of the first captured stream; receiving at least a second captured stream of the event from at least a second multicamera, wherein the first and the second captured streams have been captured simultaneously from different perspectives of the event; switching the presentation of the first captured stream on the head mounted display to a presentation of the second captured stream, wherein the switching comprises rendering on the head mounted display a presentation of at least one view between the first and second multicameras, wherein the rendering depends on the intrinsic and extrinsic parameters of the at least two multicameras.

According to an embodiment, the method further comprises tracking an object of interest between the first multicamera and the second multicamera for determining a rendering direction.

According to an embodiment, the method further comprises tracking a set of evenly distributed capturing points between a capturing point of the first multicamera and a capturing point of the second multicamera.

According to an embodiment, a number of views to be rendered depends on the physical distance between the first multicamera and the second multicamera.

According to an embodiment, a number of views to be rendered depends on a frame per second of content and the duration allocated for switching the content between the first multicamera and the second multicamera.

According to an embodiment, the method comprises determining a direction of the at least one view between the first and second multicameras based on a direction of both first and second multicameras. According to an embodiment, the direction of the at least one view is towards a crossing point of a viewing direction of the first multicamera and a viewing direction of the second multicamera.

According to a second aspect, there is provided an apparatus comprising at least one processor, memory including computer program code, the memory and the computer program code configured to, with the at least one processor, cause the apparatus to perform at least the following: receive a first captured stream of an event from a first multicamera; provide on a head mounted display a presentation of the first captured stream; receive at least a second captured stream of the event from at least a second multicamera, wherein the first and the second captured streams have been captured simultaneously from different perspectives of the event; switch the presentation of the first captured stream on the head mounted display to a presentation of the second captured stream, wherein the switching comprises rendering on the head mounted display a presentation of at least one view between the first and second multicameras, wherein the rendering depends on the intrinsic and extrinsic parameters of the at least two multicameras.

According to an embodiment, the apparatus further comprises computer program code configured to cause the apparatus to track an object of interest between the first multicamera and the second multicamera for determining a rendering direction.

According to an embodiment, the apparatus further comprises computer program code configured to cause the apparatus to track a set of evenly distributed capturing points between a capturing point of the first multicamera and a capturing point of the second multicamera.

According to an embodiment, a number of views to be rendered depends on the physical distance between the first multicamera and the second multicamera.

According to an embodiment, a number of views to be rendered depends on a frame per second of content and the duration allocated for switching the content between the first multicamera and the second multicamera.

According to an embodiment, the apparatus comprises computer program code configured to cause the apparatus to determine a direction of the at least one view between the first and second multicameras based on a direction of both first and second multicameras.

According to an embodiment, the direction of the at least one view is towards a crossing point of a viewing direction of the first multicamera and a viewing direction of the second multicamera.

According to a third aspect, there is provided an apparatus comprising: means for receiving a first captured stream of an event from a first multicamera; means for providing on a head mounted display a presentation of the first captured stream; means for receiving at least a second captured stream of the event from at least a second multicamera, wherein the first and the second captured streams have been captured simultaneously from different perspectives of the event; means for switching the presentation of the first captured stream on the head mounted display to a presentation of the second captured stream, wherein the switching comprises rendering on the head mounted display a presentation of at least one view between the first and second multicameras, wherein the rendering depends on the intrinsic and extrinsic parameters of the at least two multicameras.

According to an embodiment, the apparatus further comprises means for tracking an object of interest between the first multicamera and the second multicamera for determining a rendering direction.

According to an embodiment, the apparatus further comprises means for tracking a set of evenly distributed capturing points between a capturing point of the first multicamera and a capturing point of the second multicamera.

According to an embodiment, a number of views to be rendered depends on the physical distance between the first multicamera and the second multicamera.

According to an embodiment, a number of views to be rendered depends on a frame per second of content and the duration allocated for switching the content between the first multicamera and the second multicamera.

According to an embodiment, the apparatus further comprises means for determining a direction of the at least one view between the first and second multicameras based on a direction of both first and second multicameras.

According to an embodiment, the direction of the at least one view is towards a crossing point of a viewing direction of the first multicamera and a viewing direction of the second multicamera.

According to a fourth aspect, there is provided computer program product embodied on a non-transitory computer readable medium, comprising computer program code configured to, when executed on at least one processor, cause an apparatus or a system to: receive a first captured stream of an event from a first multicamera; provide on a head mounted display a presentation of the first captured stream; receive at least a second captured stream of the event from at least a second multicamera, wherein the first and the second captured streams have been captured simultaneously from different perspectives of the event; switch the presentation of the first captured stream on the head mounted display to a presentation of the second captured stream, wherein the switching comprises rendering on the head mounted display a presentation of at least one view between the first and second multicameras, wherein the rendering depends on the intrinsic and extrinsic parameters of the at least two multicameras.

According to an embodiment, the computer program product further comprises computer program code configured to cause the apparatus to track an object of interest between the first multicamera and the second multicamera for determining a rendering direction.

According to an embodiment, the computer program product further comprises computer program code configured to cause the apparatus to track a set of evenly distributed capturing points between a capturing point of the first multicamera and a capturing point of the second multicamera.

According to an embodiment, a number of views to be rendered depends on the physical distance between the first multicamera and the second multicamera.

According to an embodiment, a number of views to be rendered depends on a frame per second of content and the duration allocated for switching the content between the first multicamera and the second multicamera.

According to an embodiment, the computer program product comprises computer program code configured to cause the apparatus to determine a direction of the at least one view between the first and second multicameras based on a direction of both first and second multicameras.

According to an embodiment, the direction of the at least one view is towards a crossing point of a viewing direction of the first multicamera and a viewing direction of the second multicamera.

DESCRIPTION OF THE DRAWINGS

In the following, various embodiments of the invention will be described in more detail with reference to the appended drawings, in which

FIG. 6 shows an example of a multicamera system capturing an event;

FIG. 7 shows an example of a multicamera system capturing an event and switching from a first captured content to a second captured content;

DESCRIPTION OF EXAMPLE EMBODIMENTS

The present embodiments are discussed in relation to content captured with several multicamera capturing devices. A multicamera capturing device comprises two or more cameras, wherein the two or more cameras may be arranged in pairs in said multicamera capturing device. Each said camera has a respective field of view, and each said field of view covers the view direction of the multicamera capturing. In the following description, "multicamera capturing device" is shortly referred to with a term "multicamera".

A multicamera may comprise cameras at locations corresponding to at least some of the eye positions of a human head at normal anatomical posture, eye positions of the human head at maximum flexion anatomical posture, eye positions of the human head at maximum extension anatomical postures, and/or eye positions of the human head at maximum left and right rotation anatomical postures. A multicamera may comprise at least three cameras, the cameras being disposed such that their optical axes in the direction of the respective camera's field of view fall within a hemispheric field of view, the multicamera comprising no cameras having their optical axes outside the hemispheric field of view, and the multicamera having a total field of view covering a full sphere.

The multicamera described here may have cameras with wide-angle lenses. The multicamera may be suitable for creating stereo viewing image data and/or multiview video, comprising a plurality of video sequences for the plurality of cameras. The multicamera may be such that any pair of cameras of the at least two cameras has a parallax corresponding to parallax (disparity) of human eyes for creating a stereo image. At least two cameras may have overlapping fields of view such that an overlap region for which every part is captured by said at least two cameras is defined, and such overlap area can be used in forming the image for stereo viewing.

Figure 1:
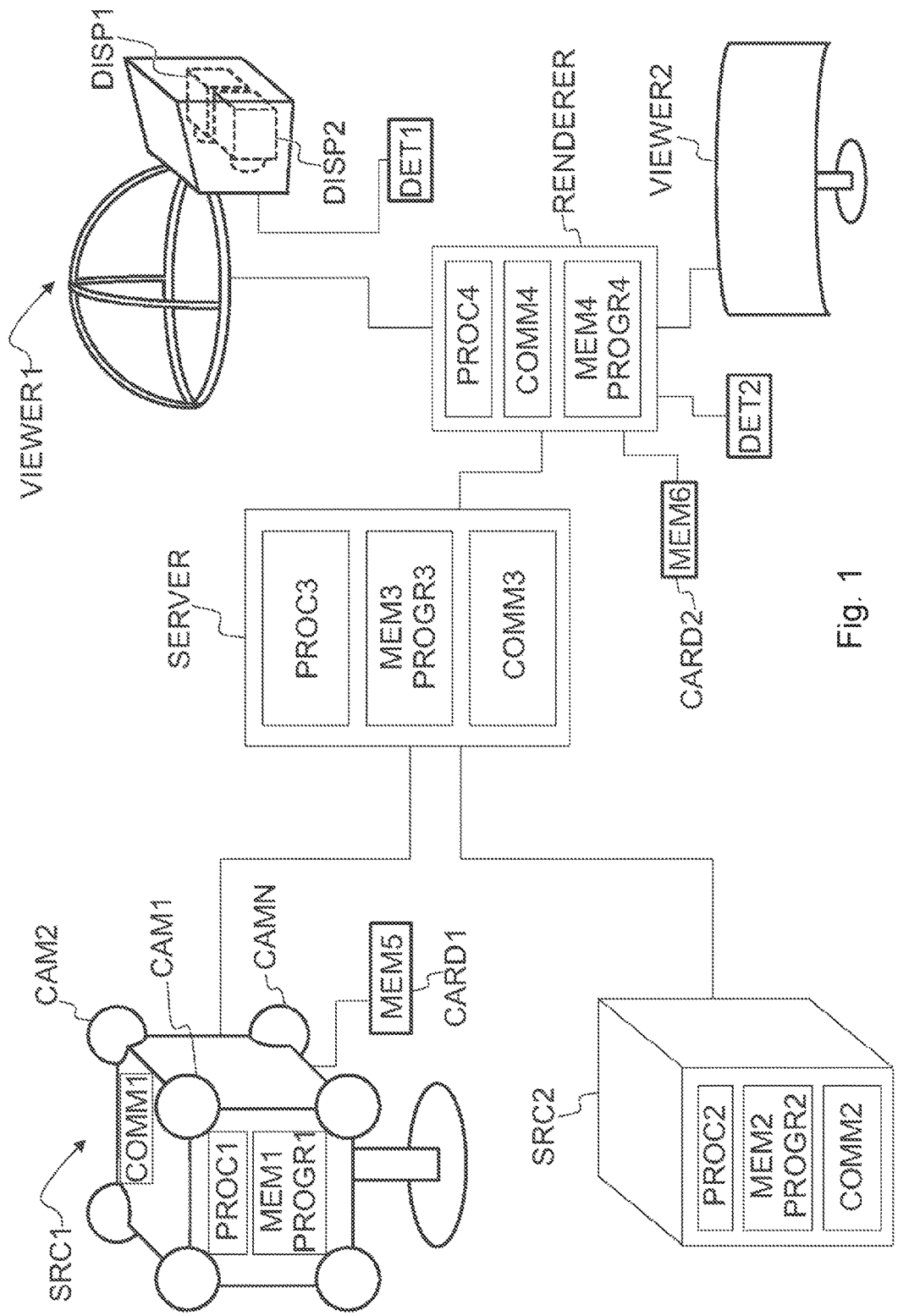
FIG. 1 shows a system and apparatuses for stereo viewing.

FIG. 1 shows a system and apparatuses for stereo viewing, that is, for 3D video and 3D audio digital capture and playback. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. In image source, such as a multicamera, e.g. a video capture device SRC1, comprises multiple cameras CAM1, CAM2, . . . , CAMN with overlapping field of view so that regions of the view around the multicamera is captured from at least two cameras. The device SRC1 may comprise multiple microphones to capture the timing and phase differences of audio originating from different directions. The device SRC1 may comprise a high resolution orientation sensor so that the orientation (direction of view) of the plurality of cameras can be detected and recorded. The device SRC1 comprises or is functionally connected to a computer processor PROC1 and memory MEM1, the memory comprising computer program PROGR1 code for controlling the multicamera. The image stream captured by the multicamera may be stored on a memory device MEM2 for use in another device, e.g. a viewer, and/or transmitted to a server using a communication interface COMM1. It needs to be understood that although an 8-camera-cubical setup is described here as part of the system, another multicamera (e.g. a stereo camera) device may be used instead as part of the system.

Alternatively or in addition to the video capture device SRC1 creating an image stream, or a plurality of such, one or more sources SRC2 of synthetic images may be present in the system. Such sources may use a computer model of a virtual world to compute the various image streams it transmits. For example, the source SRC2 may compute N video streams corresponding to N virtual cameras located at a virtual viewing position. When such a synthetic set of video streams is used for viewing, the viewer may see a three-dimensional virtual world. The device SRC2 comprises or is functionally connected to a computer processor PROC2 and memory MEM2, the memory comprising computer program PROGR2 code for controlling the synthetic sources device SRC2. The image stream captured by the device may be stored on a memory device MEM5 (e.g. memory card CARD1) for use in another device, e.g. a viewer, or transmitted to a server or the viewer using a communication interface COMM2.

There may be a storage, processing and data stream serving network in addition to the multicamera, such as the video capture device SRC1. For example, there may be a server SERVER or a plurality of servers storing the output from the video capture device SRC1 or computation device SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream from a server and for decoding the video data stream. The data stream may be received over a network connection through communications interface COMM4, or from a memory device MEM6 like a memory card CARD2. The viewer devices may have a graphics processing unit for processing of the data to a suitable format for viewing. The viewer VIEWER1 comprises a high-resolution stereo-image head-mounted display for viewing the rendered stereo video sequence. The head-mounted display may have an orientation sensor DET1 and stereo audio headphones. The viewer VIEWER2 comprises a display enable with 3D technology (for displaying stereo video), and the rendering device may have a head-orientation detector DET2 connected to it. Any of the devices (SRC1, SRC2, SERVER, RENDERER, VIEWER1, VIEWER2) may be a computer or a portable computing device, or be connected to such. Such rendering devices may have computer program code for carrying out methods according to various examples described in this text.

Figure 2A:
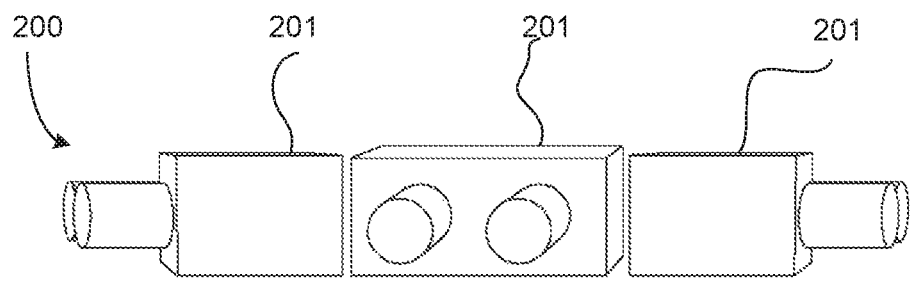
FIG. 2a shows a camera device for stereo viewing.

FIG. 2a shows a camera device 200 for stereo viewing. The camera comprises two or more cameras that are configured into camera pairs 201 for creating the left and right eye images, or that can be arranged to such pairs. The distances between cameras may correspond to the usual (or average) distance between the human eyes. The cameras may be arranged so that they have significant overlap in their field-of-view. For example, wide-angel lenses of 180-degrees or more may be used, and there may be 2, 3, 4, 5, 6, 7, 8, 9, 10, 12, 16, or 20 cameras. The cameras may be regularly or irregularly spaced to access the whole sphere of view, or they may cover only part of the whole sphere. For example, there may be three cameras arranged in a triangle and having different directions of view towards one side of the triangle such that all three cameras cover an overlap area in the middle of the directions of view. As another example, 8 cameras having wide-angle lenses and arranged regularly at the corners of a virtual cube and covering the whole sphere such that the whole or essentially whole sphere is covered at all directions by at least 3 or 4 cameras. In FIG. 2a three stereo camera pairs 201 are shown.

Multicameras with other types of camera layouts may be used. For example, a camera device with all cameras in one hemisphere may be used. The number of cameras may be e.g., 2, 3, 4, 6, 8, 12, or more. The cameras may be placed to create a central field of view where stereo images can be formed from image data of two or more cameras, and a peripheral (extreme) field of view where one camera covers the scene and only a normal non-stereo image can be formed.

Figure 2B:
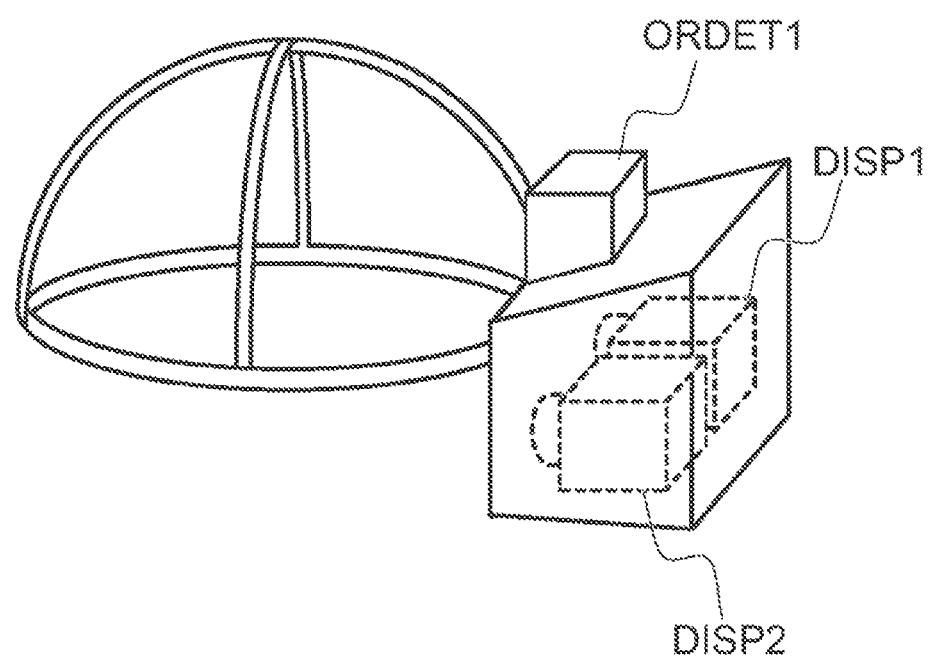
FIG. 2b shows a head-mounted display for stereo viewing.

FIG. 2b shows a head-mounted display for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

Figure 3:
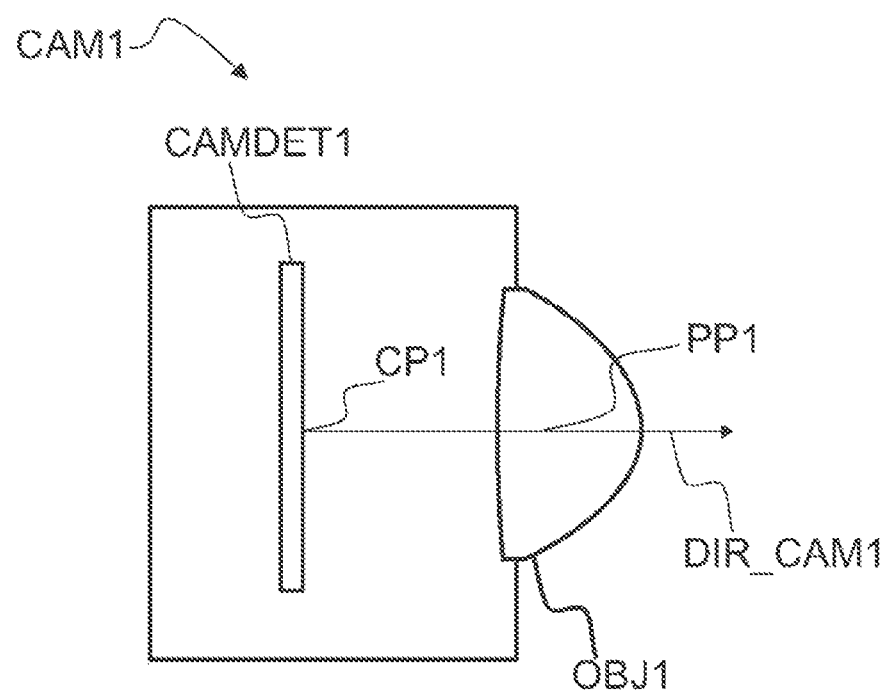
FIG. 3 shows a camera according to an embodiment.

FIG. 3 illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

The system described above may function as follows. Time-synchronized video, audio and orientation data is first recorded with the multicamera. This can consist of multiple concurrent video and audio streams as described above. These are then transmitted immediately or later to storage and to a processing network for processing and conversion into a format suitable for subsequent delivery to playback devices. The conversion can involve post-processing steps to the audio and video data in order to improve the quality and/or reduce the quantity of the data while preserving the quality at a desired level. Finally, each playback device receives a stream of the data from the network, and renders it into a stereo viewing reproduction of the original location which can be experienced by a user with the head-mounted display and headphones.

Figure 4A:
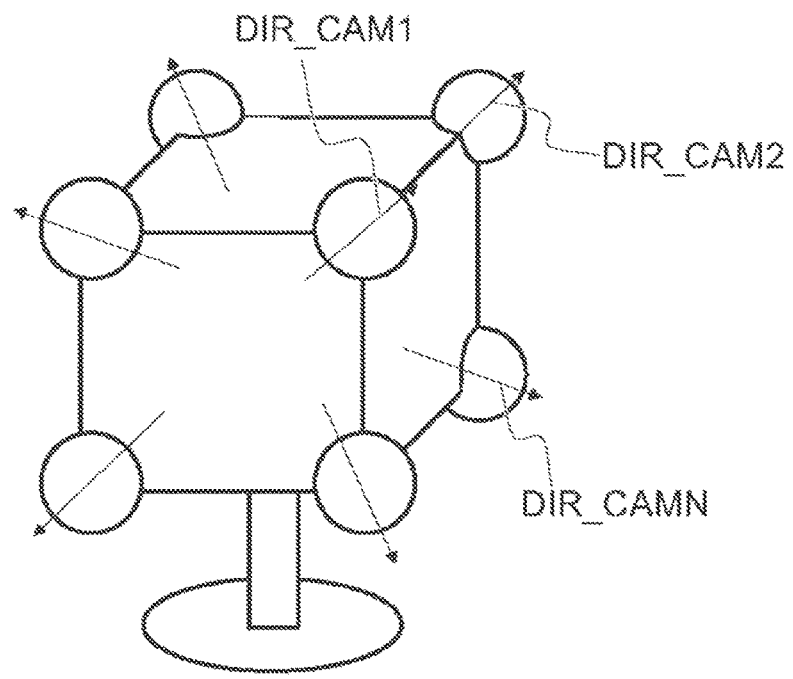
FIG. 4a, b show examples of a multicamera.
Figure 4B:
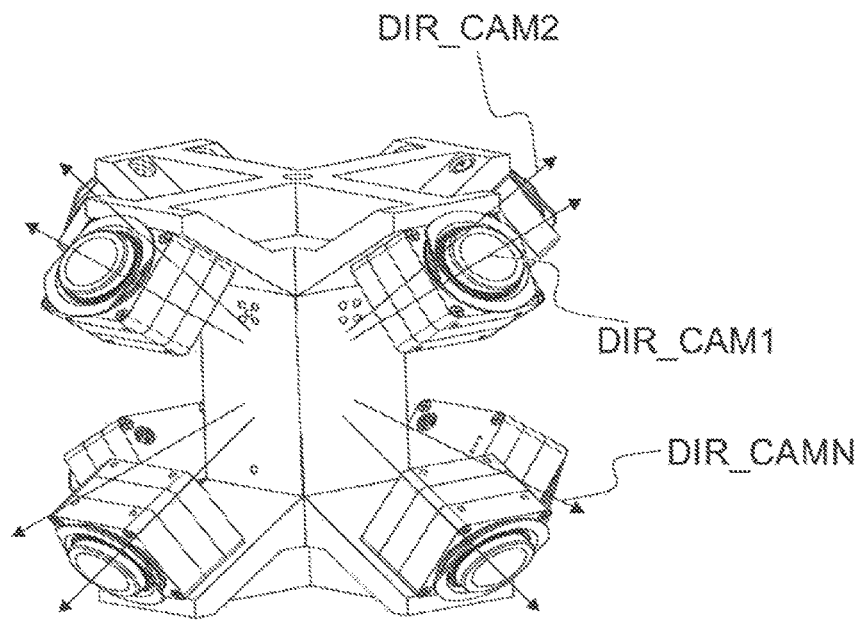

FIGS. 4a and 4b show an example of a multicamera for being used as an image source. To create a full 360 degree stereo panorama every direction of view needs to be photographed from two locations, one for the left eye and one for the right eye. In case of video panorama, these images need to be shot simultaneously to keep the eyes in sync with each other. As one camera cannot physically cover the whole 360 degree view, at least without being obscured by another camera, there need to be multiple cameras to form the whole 360 degree panorama. Additional cameras however increase the cost and size of the system and add more data streams to be processed. This problem becomes even more significant when mounting cameras on a sphere or platonic solid shaped arrangement to get more vertical field of view. However, even by arranging multiple camera pairs on for example a sphere or platonic solid such as octahedron or dodecahedron, the camera pairs will not achieve free angle parallax between the eye views. The parallax between eyes is fixed to the positions of the individual cameras in a pair, that is, in the perpendicular direction to the camera pair, no parallax can be achieved. This is problematic when the stereo content is viewed with a head mounted display that allows free rotation of the viewing angle around z-axis as well.

The multicameras may also be equipped with ranging sensors to calculate the distance of object in the scene from the multicamera representing the depth information of the scene. Depth information can be obtained by various means. For example, depth of the 3D scene may be computed from the disparity registered by multicameras or by colour image sensors. A depth estimation approach, which may also be referred to as stereo matching, takes a stereoscopic view as an input and computes local disparities between the two offset images of the view. Since the two input views represent different viewpoints or perspectives, the parallax creates a disparity between the relative positions of scene points on the imaging planes depending on the distance of the points. A target of stereo matching is to extract those disparities by finding or detecting the corresponding points between the images. Several approaches for stereo matching exist. For example, in a block or template matching approach each image is processed pixel by pixel in overlapping blocks, and for each block of pixels a horizontally localized search for a matching block in the offset image is performed. Once a pixel-wise disparity is computed, the corresponding depth value z is calculated by:

$$z = \frac{f \cdot b}{d + \Delta d},$$

where $f$ is the focal length of the camera and b is the baseline distance between cameras. Further, d may be considered to refer to the disparity observed between the two cameras or the disparity estimated between corresponding pixels in the two cameras. The camera offset $\Delta d$ may be considered to reflect a possible horizontal misplacement of the optical centres of the two cameras or a possible horizontal cropping in the camera frames due to pre-processing. However, since the algorithm is based on block matching, the quality of a depth-through-disparity estimation is content dependent and very often not accurate. For example, no straightforward solution for depth estimation is possible for image fragments that are featuring very smooth areas with no textures or large level of noise.

Another approach to represent the depth values of different views in the stereoscopic or multiview case is to report the disparity between pixels of each view to the adjacent view instead of the actual depth values. The following equation shows how depth values are converted to disparity:

$$D = f \times l \times \left( \frac{d}{2^N - 1} \times \left( \frac{1}{Z_{near}} - \frac{1}{Z_{far}} \right) + \frac{1}{Z_{far}} \right)$$

where:
D=disparity value
$f$=focal length of capturing camera
l=translational difference between cameras
d=depth map value
N=number of bits representing the depth map values
$Z_{near}$ and $Z_{far}$ are the respective distances of the closest and farthest objects in the scene to the camera (mostly available from the content provider), respectively.

The semantics of depth map values may for example include the following:
1. Each luma sample value in a coded depth view component represents an inverse of real-world distance (Z) value, i.e. $1/Z$, normalized in the dynamic range of the luma samples, such as to the range of 0 to 255, inclusive, for 8-bit luma representation. The normalization may be done in a manner where the quantization $1/Z$ is uniform in terms of disparity.
2. Each luma sample value in a coded depth view component represents an inverse of real-world distance (Z) value, i.e. $1/Z$, which is mapped to the dynamic range of the luma samples, such as to the range of 0 to 255, inclusive, for 8-bit luma representation, using a mapping function $f(1/Z)$ or table, such as a piece-wise linear mapping. In other words, depth map values result in applying the function $f(1/Z)$.
3. Each luma sample value in a coded depth view component represents a real-world distance (Z) value normalized in the dynamic range of the luma samples, such as to the range of 0 to 255, inclusive, for 8-bit luma representation.
4. Each luma sample value in a coded depth view component represents a disparity or parallax value from the present depth view to another indicated or derived depth view or view position.

The semantics of depth map values may be indicated in the bit-stream, for example, within a video parameter set syntax structure, a sequence parameter set syntax structure, a video usability information syntax structure, a picture parameter set syntax structure, a camera/depth/adaptation parameter set syntax structure, a supplemental enhancement information message, or anything alike.

Alternatively or in addition to the above-described stereo view depth estimation, the depth value may be obtained using the time-of-flight (TOF) principle for example by using a camera which may be provided with a light source, for example an infrared emitter, for illuminating the scene. Such an illuminator may be arranged to produce an intensity modulated electromagnetic emission for a frequency between e.g. 10-100 MHz, which may require LEDs or laser diodes to be used. Infrared light may be used to make the illumination unobtrusive. The light reflected from objects in the scene is detected by an image sensor, which may be modulated synchronously at the same frequency as the illuminator. The image sensor may be provided with optics; a lens gathering the reflected light and an optical bandpass filter for passing only the light with the same wavelength as the illuminator, thus helping to suppress background light. The image sensor may measure for each pixel the time the light has taken to travel from the illuminator to the object and back. The distance to the object may be represented as a phase shift in the illumination modulation, which can be determined from the sampled data simultaneously for each pixel in the scene.

Alternatively or in addition to the above-described stereo view depth estimation and/or TOF-principle depth sensing, depth values may be obtained using a structured light approach which may operate for example approximately as follows. A light emitter, such as an infrared laser emitter or an infrared LED emitter, may emit light that may have a certain direction in a 3D space (e.g. follow a raster-scan or a pseudo-random scanning order) and/or position within an array of light emitters as well as a certain pattern, e.g. a certain wavelength and/or amplitude pattern. The emitted light is reflected back from objects and may be captured using a sensor, such as an infrared image sensor. The image/signals obtained by the sensor may be processed in relation to the direction of the emitted light as well as the pattern of the emitted light to detect a correspondence between the received signal and the direction/position of the emitted lighted as well as the pattern of the emitted light for example using a triangulation principle. From this correspondence a distance and a position of a pixel may be concluded.

It is to be understood that the above-described depth estimation and sensing methods are provided as non-limiting examples and embodiments may be realized with the described or any other depth estimation and sensing methods and apparatuses.

The requirement for multiple cameras covering every point around the multicamera twice would require a very large number of cameras in the multicamera. In this technique lenses are used with a field of view of 180 degree (hemisphere) or greater, and the cameras are arranged with a carefully selected arrangement around the multicamera. Such an arrangement is shown in FIG. 4a, where the cameras have been positioned at the corners of a virtual cube, having orientations DIR_CAM1, DIR_CAM2, . . . , DIR_CAMN pointing away from the center point of the cube. Naturally, other shapes, e.g. the shape of a cuboctahedron, or other arrangement, even irregular ones, can be used. Overlapping super wide field of view lenses may be used so that a camera can serve both as the left eye view of a camera pair and as the right eye view of another camera pair. This reduces the amount of needed cameras to half. As a surprising advantage, reducing the number of cameras in this manner increases the stereo viewing quality, because it also allows to pick the left eye and right eye cameras arbitrarily among all the cameras as long as they have enough overlapping view with each other. Using this technique with different number of cameras and different camera arrangements such as sphere and platonic solids enables picking the closest matching camera for each eye achieving also vertical parallax between the eyes. This is beneficial especially when the content is viewed using head mounted display. The described camera setup may allow creating stereo viewing with higher fidelity and smaller expenses of the camera device.

The present embodiments relate to system having more than one multicameras. In particular, the present embodiments relate to capturing content with several multicameras to enable 360 degree presentation on the scene from different points of view. In the present embodiments, a user is enabled to switch from one multicamera to another multicamera to see a different perspective of the scene. In addition to or instead of the user selection, the switching may also depend on the content provider (e.g. a director of the multicameras capturing the event).

When switching from one multicamera to another multicamera, the sense of direction can be lost (as opposed to the 2D content camera switch). This is due to the fact that the HMD provides viewing direction based on the current head position/direction of the user, and while switching to the new location, it is possible to view the scene from another point of view and hence lose the sense of direction. The present embodiments are targeted to minimize the wrong impression on the direction experienced by the user.

In the present embodiments, a user is using a display device, such as a head-mounted display, and views a content being simultaneously captured with more than one multicameras. The multicamera providing the content from a certain perspective for viewing, can be switched to another multicamera during viewing in such a manner that the user is able to view another perspective on the same content. However, sudden movement to another multicamera and perceiving the same point of view from another angle without moving head or body may cause strange feeling. It is to be noticed that such feeling may not occur in conventional 2D/3D content presentation since the feeling of the presence in the scene is not felt in those presentations. In other words, there is a lack of orientation based watching capability in conventional 2D/3D content presentation as compared to virtual content reality watched by a HMD. Therefore, the present embodiments are targeted to find a smooth solution on how to move from the views captured by one multicamera to the views captured by another multicamera.

A system according to an embodiment comprises more than one multicameras. The multicameras are aware on each other's location and/or orientation. When switching from a multicamera A to multicamera B having any desired number of frames in between, those several frames between the multicamera A and the multicamera B are to be rendered and shown to the user. This means that a whole frame based connection between the multicamera A and the multicamera B will be rendered and shown to the end user during the switching between the multicameras. Such views will be shown to the user from the point of view of virtual multicameras as if they were present in those locations (during the multicamera switch between multicamera A and multicamera B).

FIG. 6 illustrates an example of using several multicameras 601, 602, 603, 604, 605, 606 for capturing an event from different perspectives. In the example of FIG. 6, the several multicameras 601, 602, 603, 604, 605, 606 are configured to record video material from a football field 600, where the object of interest is a football 610. The different multicameras 601, 602, 603, 604, 605, 606 are able to be informed about location and/or orientation of other multicameras while capturing the same event.

FIG. 7 illustrates an example on what needs to be done in a situation where the displayable content originating from a multicamera 606 needs to be switched to a content captured by another multicamera 605. Such a need may occur, when the object of interest, e.g., a football 610, changes its location from a location 1 to a location 2, and the other multicamera 605 provides a better perspective to the location 2. Alternatively, such switching may happen when the capturing director prefers the viewing location of multicamera 605 as compared to the viewing location of multicamera 606. In another embodiment, the user watching the content has the capability of switching to another multicamera based on his/her personal preference. Moreover, the decision to switch to another multicamera may be made by the multicameras and based on image processing algorithms, when the object of interest is blocked from one view and visible from another view e.g. when a spectator is standing in front of multicamera 606 and blocking the viewing of the football. When switching from a first multicamera 606 to a second multicamera 605, at least one view between them may be rendered and presented to the user. Any rendering algorithm can be used for rendering new views from available views of the multicamera 606 and multicamera 605. The number of views to be rendered may depend on the criteria set by the capturing director or the preference of the user. For example, one or more available views may be taken into account to render another view from another point of view which has not been captured by any camera (i.e. virtual view). Rendering a virtual view may depend also on the available content from any other available multicamera and may not only depend on the adjacent multicameras to the view to be rendered e.g. the rendering may also depend on the content from multicamera 604. Such process can be texture based or can be based on respective depth information for each view. This rendering process may be referred to as a view synthesis, where the available views are utilized when synthesizing the virtual views.

Figure 8:
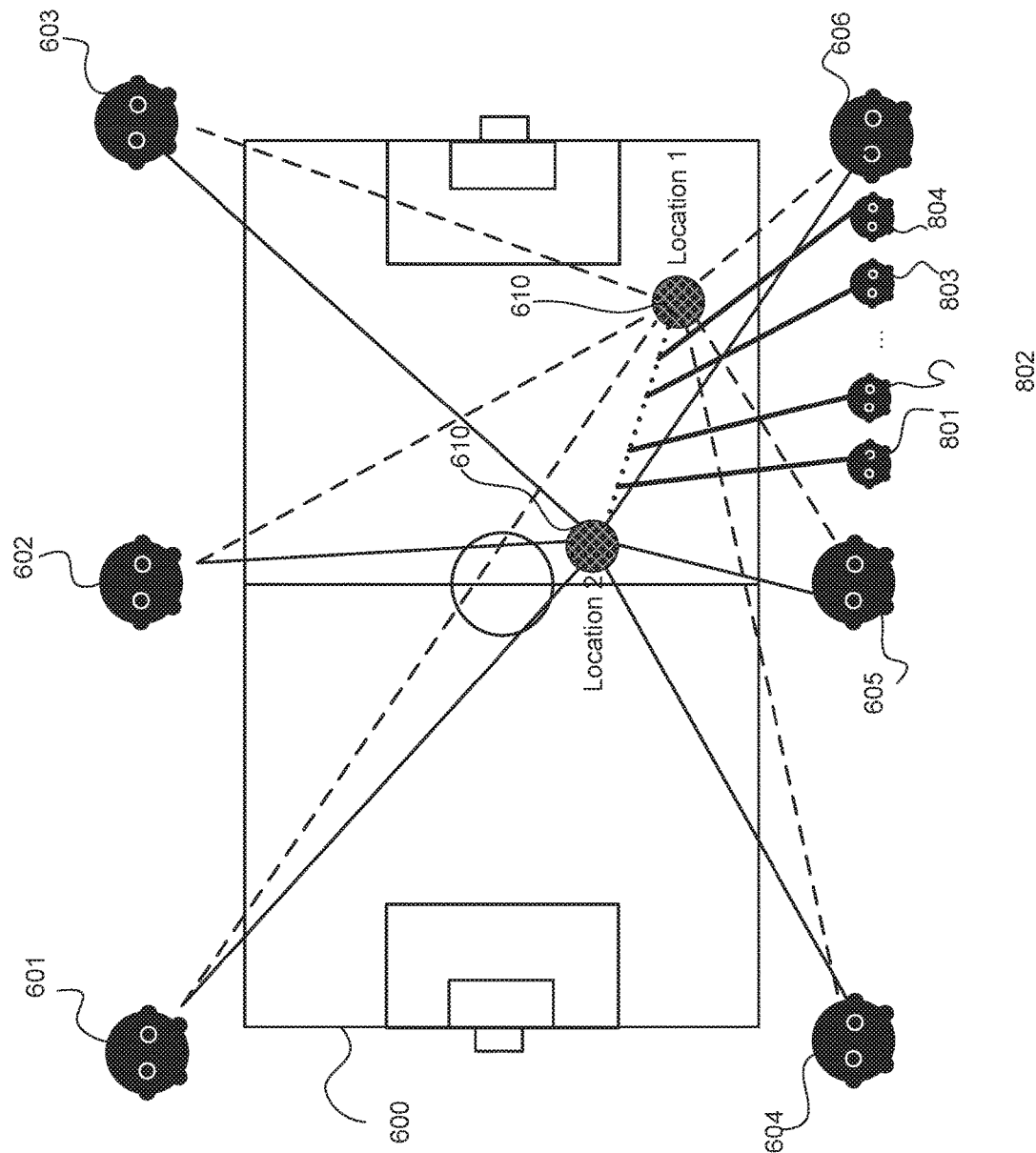
FIG. 8 shows an embodiment of a method for generating synthesized views.

According to an embodiment, the synthesized views can be rendered according to an evenly divided straight line between the viewing location of the first (the one whose content is being played currently) and the second multicamera (the one the view is switched to). This is illustrated in FIG. 8. In the example of FIG. 8, the distance between the first 605 and second multicamera 606 is divided into a calculated number of viewing points. These viewing points are virtual locations of virtual multicameras 801, 802, 803, 804 capturing the event between the first 605 and the second multicamera 606. The calculation may be done based on the physical distance between multicameras 605 and multicamera 606, video FPS (Frames per Second), switching duration (the amount of time required to switch the presentation of content from the first multicamera to the second multicamera), or other factors. The views for each viewing point are rendered and shown to the user during the switching process between the multicameras 606 and 605. According to an embodiment, the switching duration can be adjusted based on the distance between the multicameras. The virtual multicameras 801, 802, 803, 804 shown in FIG. 8 are configured to render the scene from the switching direction point of view. The direction of rendered views may be aligned with direction of the first multicamera.

Figure 9:
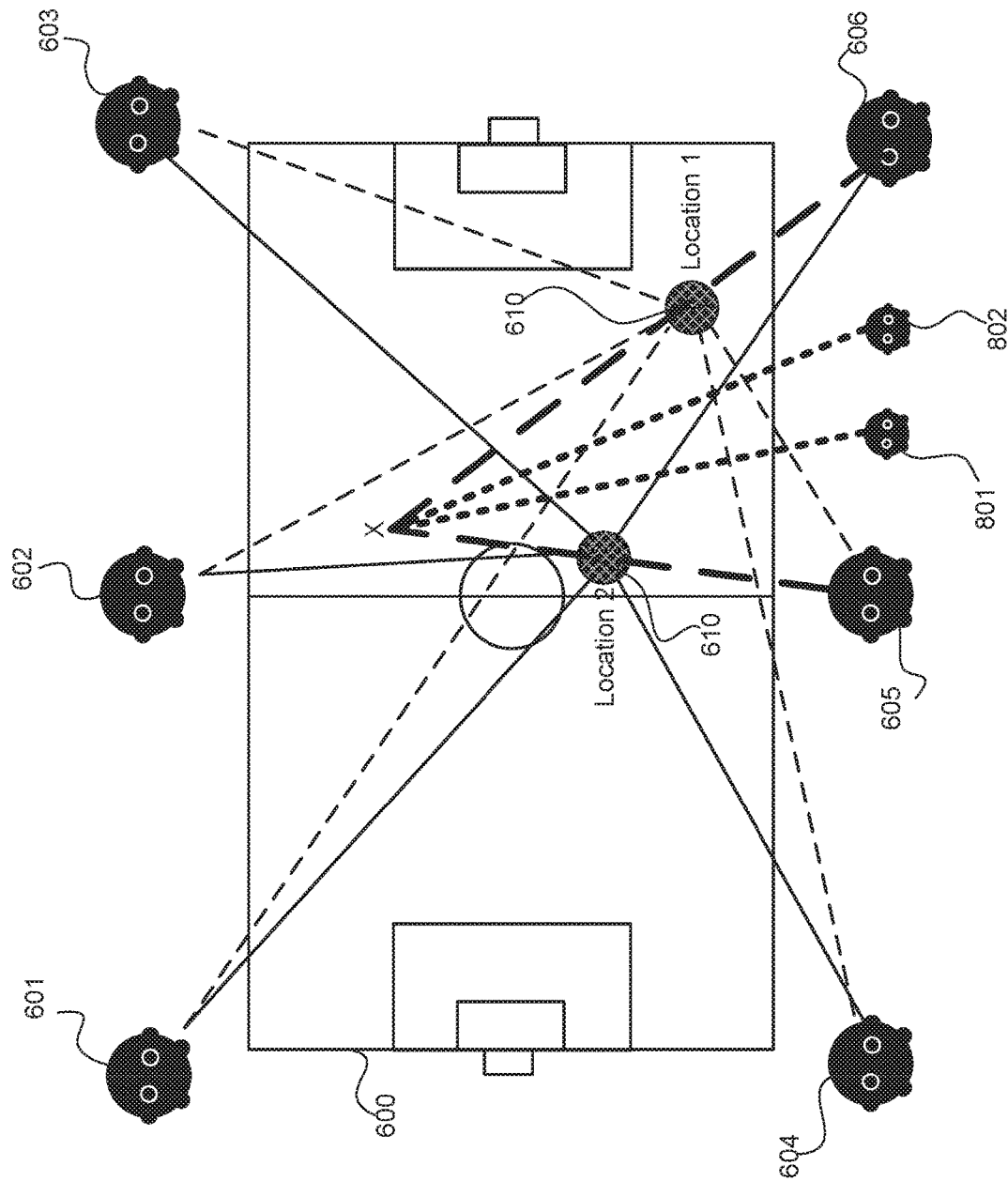
FIG. 9 shows another embodiment of a method for generating synthesized views.

Alternatively, the direction of rendered views may be decided based on the direction of both first and second multicameras. This is illustrated in FIG. 9 where the viewing direction of rendered views is changing according to the difference between the viewing direction of the first and second multicameras. In FIG. 9, the distance between the first multicamera 606 and second multicamera 605 is covered by two virtual multicameras 801, 802. In the case where the distance between the first 606 and second 605 multicameras is evenly covered with a specific number of virtual multicameras e.g. N, then the angle difference between the first 606 and second 605 multicamera may also be evenly divided to cover the required virtual multicameras and in each step, along with the movement of the virtual multicameras, the viewing direction also changes accordingly towards the correct direction. It should be noted that the angle difference between the viewing directions of the first 606 and second 605 multicameras should be divided to N+1 to fully cover the difference including the first 606 and second 605 multicameras. For example if the first multicamera 606 and second multicamera 605 have a viewing direction angle difference of 45 degrees and the distance between them is covered with 8 virtual multicameras, then the viewing angle difference between each adjacent virtual multicamera should be 45/(8+1)=5 degrees. Meaning that when starting from the first multicamera 606 and moving towards the second multicamera 605, the viewing direction used for rendering the views from virtual multicameras should change 5 degrees at each step where step refers to moving from one multicamera to the next adjacent multicamera. This also means that the viewing direction of the virtual multicameras is towards the viewing direction crossing point X of the first multicamera 606 and second multicamera 605. This is also illustrated in FIG. 9.

Figure 10:
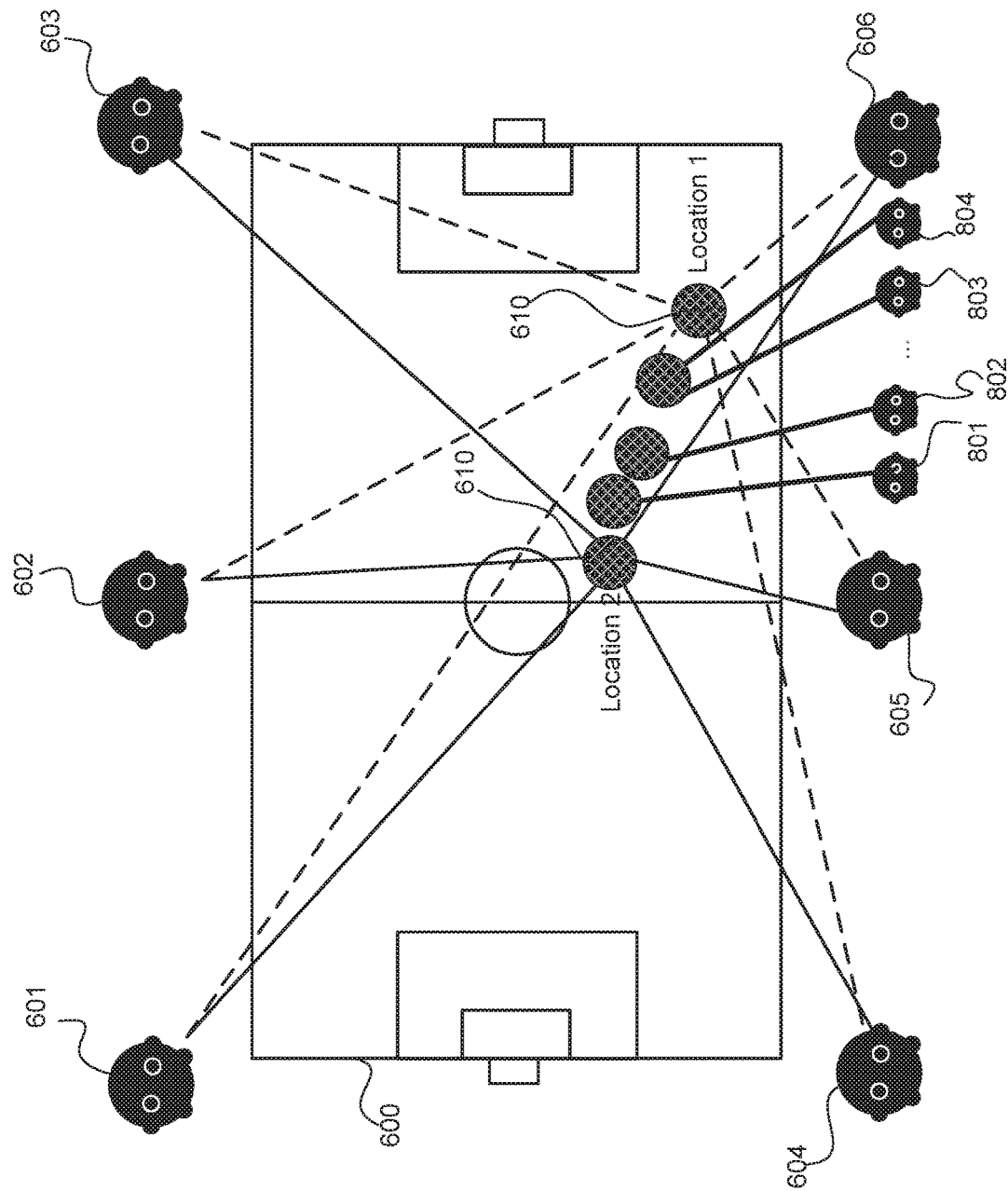
FIG. 10 shows another embodiment of a method for generating synthesized views.

According to another embodiment, the synthesized views can be rendered according to the movement of the object of interest 610 in between the first 605 and the second multicamera 606. In this example, the object of interest 610 needs to be tracked between the available multicameras 605, 606. This is shown in FIG. 10. In the example of FIG. 10, the object of interest 610 may define exactly where the views are to be rendered. For example, if the object of interest 610 is moving slowly close to multicamera 606, and the movement speed increases close to multicamera 605, then the number of rendered views close to the multicamera 606 may be more than the number of rendered views close to the multicamera 605. According to an embodiment, the duration of switch between the multicamera 606 and the multicamera 605 may depend on the movement speed of the tracked object of interest 610. Moreover, the number of frames to be rendered between the multicameras may depend on the physical distance between multicamera 605 and multicamera 606, video FPS (Frames per Second), switching duration (the amount of time required to switch the presentation of content from the first multicamera to the second multicamera), or other factors. Moreover, the viewing direction of rendered views is towards the object of interest.

In the previous examples, both the number/location of rendered views and the directions to which each of the multicameras are pointing to depends on one or more of the following conditions:

- How long is the required temporal delay to switch between the views, e.g. there is 0.4 or 0.9 seconds to switch the content from one view to another view. The longer the duration, the more frames are to be rendered.
- How far are the available multicameras from each other. This includes the physical distance between the multicameras which clarifies how the rendered frames should be spread. The longer the distance between the multicameras, the sparser the frames are.
- What is the FPS of the current video, e.g. having FPS=24 or FPS=30. The higher the FPS, the more rendered frames are to be shown to the user during a specific duration of available time and hence, the less sparse the rendered frames.
- How fast or slow the object of interest is moving between the multicameras. This means if the object of interest is moving fast, then the rendered frames should similarly move fast, and render the content according to the movement of the object of interest. In this example, the faster object movement may represent the shorter duration for switching between the multicameras and the slower movement for the object of interest may represent the longer required duration for switching between the multicameras.

In previous, embodiments for processing of media content in multicamera system have been discussed. The processing and the rendering can be implemented in a head mounted display. However, according to other embodiments, the rendering may occur in a server, and the content may be transmitted to a head mounted display in real-time.

As mentioned, the embodiments work on content being captured by at least two multicameras. The at least two pieces of content are stored in a server after capturing. All the captured content are available to be transmitted to the HMD. Alternatively, the at least two pieces of content may be stored in a HMD. When a switching between one view and another view is carried out, then—for the duration of switching—both views should be available to the HMD to be able to render the views. Similarly, any other view(s) which may have been marked as relevant for rendering should also be available to the HMD in order to perform the rendering. Such availability may be met either by requesting the respective views to be transmitted from a server or fetching them from a storage on the HMD device. However, before the rendering has started and after the rendering has been finished only the current view to be displayed is enough to be available in the HMD or to be transmitted to the HMD from the server.

It should be noted that a similar approach can be used in stereoscopic presentation of the content where same switching and rendering method will be applied on both left and right views accordingly.

Figure 11:
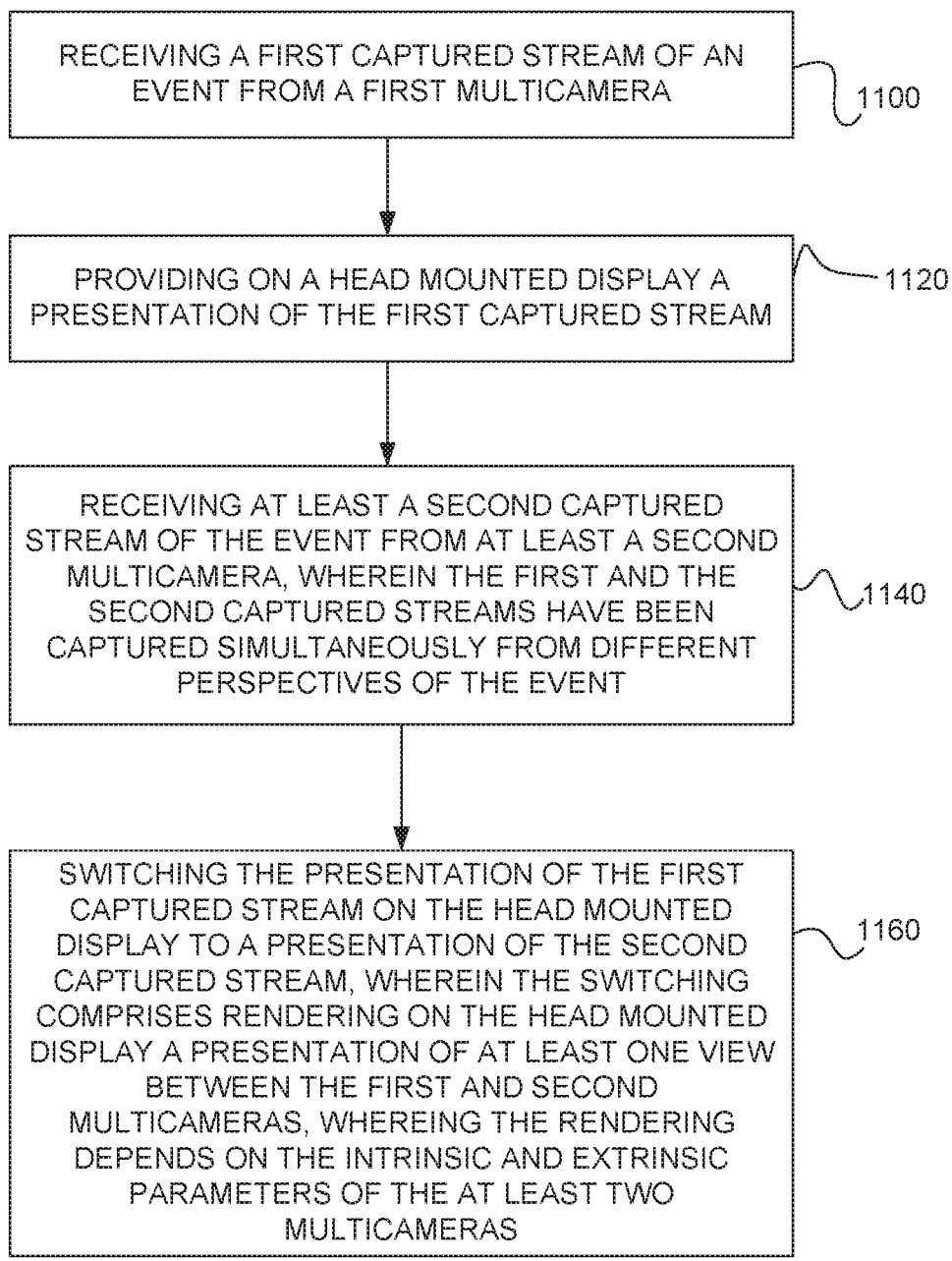
FIG. 11 shows a method according to an embodiment as a flowchart.

A method according to an embodiment is illustrated in FIG. 11. The method comprises

- receiving a first captured stream of an event from a first multicamera 1100
- providing on a head mounted display a presentation of the first captured stream 1120;
- receiving at least a second captured stream of the event from at least a second multicamera, wherein the first and the second captured streams have been captured simultaneously from different perspectives of the event 1140;
- switching the presentation of the first captured stream on the head mounted display to a presentation of the second captured stream, wherein the switching comprises rendering on the head mounted display a presentation of at least one view between the first and second multicameras 1160, wherein the rendering depends on the intrinsic and extrinsic parameters of the at least two multicameras.

The intrinsic and extrinsic parameters comprises one or more of the following: a focal length, an image sensor format, a principal point, an orientation of the camera, i.e., a position of the camera center and the direction of the camera.

An apparatus according to an embodiment comprises means for receiving a first captured stream of an event from a first multicamera; means for providing on a head mounted display a presentation of the first captured stream; means for receiving at least a second captured stream of the event from at least a second multicamera, wherein the first and the second captured streams have been captured simultaneously from different perspectives of the event; means for switching the presentation of the first captured stream on the head mounted display to a presentation of the second captured stream, wherein the switching comprises rendering on the head mounted display a presentation of at least one view between the first and second multicameras, wherein the rendering depends on the intrinsic and extrinsic parameters of the at least two multicameras. These means includes at least one processor, a memory comprising a computer program having computer-executable instructions for implementing the method.

Figure 12:
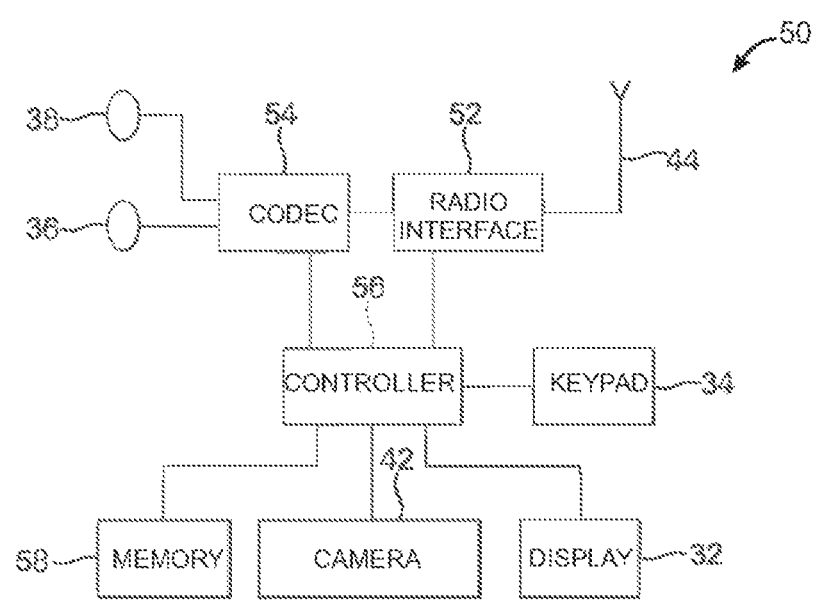
FIG. 12 shows an apparatus according to an embodiment.

An example of an apparatus is illustrated in FIG. 12 as a schematic block diagram of an electronic device 50, which may incorporate a codec 54. The apparatus 50 comprises a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display or as a voice-controllable user interface. In other examples, the user interface may be based on gaze recognition or kinetics.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator).

The apparatus may further comprise a camera 42 capable of recording or capturing images and/or video. Alternatively the apparatus 50 may be connectable to an external camera directly or indirectly.

The camera 42 may be multicamera having at least two cameras. The camera is capable of recording or detecting individual frames which are then passed to the codec 54 or the controller for processing. The apparatus may receive the video and/or image data for processing from another device prior to transmission and/or storage.

The apparatus 50 may further comprise an infrared port for short range line of sight communication to other devices. According to an embodiment, the apparatus may further comprise any suitable short range communication solution such as for example a Bluetooth wireless connection or a USB (Universal Serial Bus)/firewire wired connection.

The apparatus 50 may comprise a controller 56 or processor for controlling the apparatus 50. The controller 56 may be connected to memory 58 which may store data in the form of image, video and/or audio data, and/or may also store instructions for implementation on the controller 56. The controller 56 may further be connected to codec circuitry 54 suitable for carrying out coding and decoding of image, video and/or audio data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

Figure 5A:
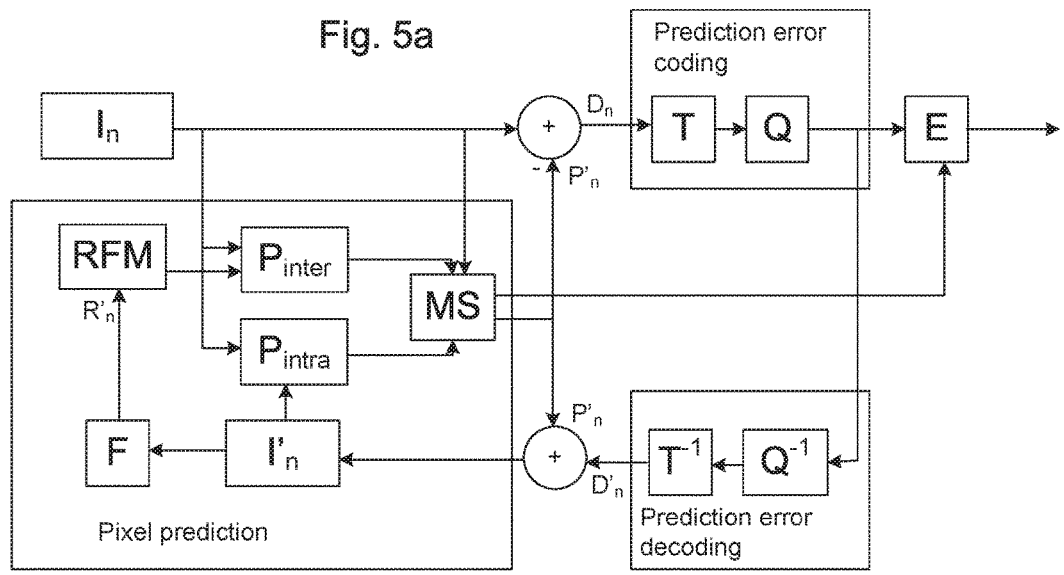
FIG. 5a, b show an encoder and a decoder according to an embodiment.
Figure 5B:
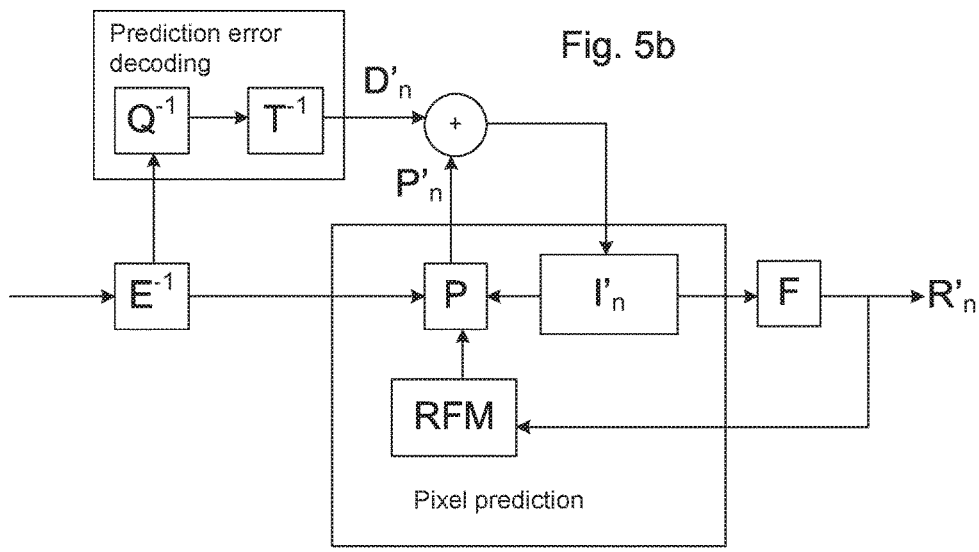

An example of a video codec 54 is illustrated in FIGS. 5a and 5b. A video codec consists of an encoder that transforms an input video into a compressed representation suited for storage/transmission and a decoder that can uncompress the compressed video representation back into a viewable form. Typically encoder discards some information in the original video sequence in order to represent the video in a more compact form (that is, at lower bitrate). An example of an encoding process is illustrated in FIG. 5a. FIG. 5a illustrates an image to be encoded ($I_n$); a predicted representation of an image block ($P'_n$); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F). An example of a decoding process is illustrated in FIG. 5b. FIG. 5b illustrates a predicted representation of an image block ($P'_n$); a reconstructed prediction error signal ($D'_n$); a preliminary reconstructed image ($I'_n$); a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method comprising
receiving a first captured stream of a scene from a first multicamera;
providing on a head mounted display a presentation of the first captured stream;
receiving at least a second captured stream of the scene from at least a second multicamera, wherein the first captured stream and the second captured stream have been captured simultaneously from different perspectives of the scene;
generating or accessing a computer model of a three dimensional (3D) virtual world representing the scene, wherein the computer model is a composite of data derived from at least the first captured stream and the second captured stream;
receiving an indication to switch the head mounted display from presenting the first captured stream to display the second captured stream;
generating from the computer model, at least one synthesized view, wherein the at least one synthesized view provides a perspective of the 3D virtual world from a respective virtual viewing position and with a respective viewing direction, wherein the respective virtual viewing position is located between the first multicamera and the second multicamera; and
switching the presentation of the first captured stream on the head mounted display to a presentation of the second captured stream, wherein the switching comprises transitioning from displaying the first captured stream to displaying the at least one synthesized view having a respective virtual viewing position between the first multicamera and the second multicamera.

2. The method according to claim 1, further comprising tracking an object of interest, in at least one of the first captured stream or second captured stream, wherein the at least one synthesized view is generated according to the tracked object.

3. The method according to claim 1, further comprising tracking a set of evenly distributed capturing points between a capturing point of the first multicamera and a capturing point of the second multicamera.

4. The method according to claim 1, where a number of synthesized views to be rendered depends on a physical distance between the first multicamera and the second multicamera.

5. The method according to the claim 1, where a number of synthesized views to be rendered depends on a frame per second of content and a duration allocated for switching the content between the first multicamera and the second multicamera.

6. The method according to claim 1, wherein the direction of the at least one synthesized view between the first multicamera and the second multicamera is towards a crossing point of a viewing direction of the first multicamera and a viewing direction of the second multicamera.

7. An apparatus comprising at least one processor, and memory including computer program code, the memory and the computer program code configured to, with the at least one processor, cause the apparatus to perform at least the following:
receive a first captured stream of a scene from a first multicamera;
provide on a head mounted display a presentation of the first captured stream;
receive at least a second captured stream of the scene from at least a second multicamera, wherein the first captured stream and the second captured stream have been captured simultaneously from different perspectives of the scene;
generate or access a computer model of a three dimensional (3D) virtual world representing the scene, wherein the computer model is a composite of data derived from at least the first captured stream and the second captured stream;
receive an indication to switch the head mounted display from presenting the first captured stream to display the second captured stream;
generate from the computer model, at least one synthesized view, wherein the at least one synthesized view provides a perspective of the 3D virtual world from a respective virtual viewing position and with a respective viewing direction, wherein the respective virtual viewing position is located between the first multicamera and the second multicamera; and
switch the presentation of the first captured stream on the head mounted display to a presentation of the second captured stream, wherein the switching comprises transitioning from displaying the first captured stream to displaying the at least one synthesized view having a respective virtual viewing position between the first multicamera and the second multicamera.

8. The apparatus according to claim 7, further comprising computer program code configured to cause the apparatus to track an object of interest in at least one of the first captured stream or second captured stream, wherein the at least one synthesized view is generated according to the tracked object.

9. The apparatus according to claim 7, further comprising computer program code configured to cause the apparatus to track a set of evenly distributed capturing points between a capturing point of the first multicamera and a capturing point of the second multicamera.

10. The apparatus according to claim 7, where a number of synthesized views to be rendered depends on a physical distance between the first multicamera and the second multicamera.

11. The apparatus according to the claim 7, where a number of synthesized views to be rendered depends on a frame per second of content and a duration allocated for switching the content between the first multicamera and the second multicamera.

12. The apparatus according to claim 7, further comprising computer program code configured to cause the apparatus to determine a rendering direction of the at least one synthesized view between the first multicamera and the second multicamera based on a viewing direction relative to the scene of the first multicamera and the second multicamera.

13. The apparatus according to claim 12, wherein the direction of the at least one synthesized view between the first multicamera and the second multicamera is towards a crossing point of a viewing direction of the first multicamera and a viewing direction of the second multicamera.

14. A computer program product embodied on a non-transitory computer readable medium, comprising computer program code configured to, when executed on at least one processor, cause an apparatus or a system to:
receive a first captured stream of a scene from a first multicamera;
provide on a head mounted display a presentation of the first captured stream;
receive at least a second captured stream of the scene from at least a second multicamera, wherein the first captured stream and the second captured stream have been captured simultaneously from different perspectives of the scene;
generate or accessing a computer model of a three dimensional (3D) virtual world representing the scene, wherein the computer model is a composite of data derived from at least the first captured stream and the second captured stream;
receive an indication to switch the head mounted display from presenting the first captured stream to display the second captured stream;
generate from the computer model, at least one synthesized view, wherein the at least one synthesized view provides a perspective of the 3D virtual world from a respective virtual viewing position and with a respective viewing direction, wherein the respective virtual viewing position is located between the first multicamera and the second multicamera; and
switch the presentation of the first captured stream on the head mounted display to a presentation of the second captured stream, wherein the switching comprises transitioning from displaying the first captured stream to displaying the at least one synthesized view having a respective virtual viewing position between the first multicamera and the second multicameras.

15. The method according to claim 1, wherein at least one of the first and second captured streams of the scene comprise audio data, and wherein the at least one synthesized view is generated further based on the audio data.

16. The method according to claim 1, wherein the computer model of the 3D virtual world further comprises additional data derived from at least a third captured stream from a third multicamera, and wherein the at least one synthesized view is generated utilizing the additional data.

17. The method according to claim 16, wherein at least one of the first, second or third multicamera is positioned non-linearly from at least two of the other of the first, second or third multicamera.

18. The method according to claim 2, wherein the object is tracked using at least a third captured stream from a third multicamera capturing the scene.

19. The method according to claim 1, wherein the at least one synthesized view is generated further based on intrinsic and extrinsic parameters of at least the first and second multicameras.

* * * * *